May 2, 1967 J. M. HUNT 3,317,905

DATA CONVERSION SYSTEM

Filed Nov. 5, 1963 3 Sheets-Sheet 1

JOHN M. HUNT
INVENTOR

BY Frederick J. Lunsford

ATTORNEY

May 2, 1967 J. M. HUNT 3,317,905

DATA CONVERSION SYSTEM

Filed Nov. 5, 1963

3 Sheets-Sheet 2

JOHN M. HUNT
INVENTOR

BY Frederick J. Smyth [signature]

ATTORNEY

May 2, 1967 J. M. HUNT 3,317,905

DATA CONVERSION SYSTEM

Filed Nov. 5, 1963 3 Sheets-Sheet 3

JOHN M. HUNT
INVENTOR

BY Frederick J. Smyth

ATTORNEY

3,317,905
DATA CONVERSION SYSTEM

John M. Hunt, Hillcrest, N.Y., assignor to General Precision, Inc., Binghamton, N.Y., a corporation of Delaware Filed Nov. 5, 1963, Ser. No. 321,555
11 Claims. (Cl. 340—347)

This invention relates to data conversion systems, and more particularly to an improved digital to analog converter which employs "time weighing" rather than conventional "resistance weighing" in order to convert a digital signal to an analog signal.

In the electronic computer, automatic control, and instrumentation arts, an increasing number of machines and processes are being controlled, and indications obtained, by means of digital computation. Because the ultimate control and indicating devices, such as motor driven valves, electric meters, and the like, are generally responsive to analog signals, a large number of installations wherein digital computation is employed require digital to analog conversion equipment to convert the computed output digital signals to corresponding analog signals.

Digital computers are generally resorted to in preference to analog computers when it is desired to attain a very high degree of computational accuracy, and, in order that the inherent accuracy of digital computation be available in the final analog output signal, it is obvious that the digital to analog converter employed also exhibit a comparable high degree of accuracy. Further, since many machines and processes, and in particular "on-stream" controllers and "real-time simulators," require calculation of relatively rapidly changing variables, it is usually necessary that the digital-to-analog converter be fast as well as accurate. Additionally, as is well known in the design of any electronic equipment, the digital to analog converter should be reliable and economical both to construct and to maintain.

According to the prior art, digital to analog converters, in general, operate by connecting precisely controlled reference voltages representing a digital 1 or a digital 0 to a matrix of summing resistors, with a different resistor selected for each bit of the digital word. Further, each resistor has a different value which is weighted in accordance with the significance of its associated bit position. As is well known, such prior art digital to analog converters become extremely difficult and expensive to design when it is desired to convert digital numbers having approximately ten significant bits, or more, since the tolerance requirements of the individual resistors becomes extreme.

Additionally, in most digital computer control applications, it is generally necessary that a plurality of digital words be converted to their respective analog signals, and, in order to effect a saving in overall equipment, the digital to analog converter is operated in a multiplexed fashion, that is, a single digital to analog converter successively converts each individual digital word to its corresponding analog signal. For the reason that no single digital word is being continuously converted, it is necessary in such prior art multiplexed systems, to employ analog "sample and hold" circuits, which are frequently unreliable, inaccurate, and expensive.

There is described in copending application Ser. No. 260,218, for Data Conversion System, filed Feb. 21, 1963, on behalf of John M. Hunt, and now patented No. 3,254,337, granted May 31, 1966 to the assignee of the present invention, a digital to analog converter which employs the principle of time weighing. As there disclosed, the concept of time weighing differs from resistance weighing in that, rather than scaling precision resistors in accordance with the significance of its associated digital bit, the precision reference voltage, corresponding to the value of a particular bit, is coupled to the analog output terminal for a time interval corresponding to the significance of the particular bit. By way of example, the least significant bit, LSB, is coupled to the output terminal for one time unit, the LSB+1 bit for two time units, the LSB+2 bit for four time units, the LSB +3 bit for eight time units, etc. In this manner no extreme precision resistors are required, regardless of the number of significant bits in the digital word being converted. Further, since the analog output channel requires, essentially merely a flip-flop, a transistor switch, and an RC filter, it becomes economically feasible to employ individual digital-to-analog converters in each analog output channel when a number of digital words are to be converted, thereby completely eliminating the analog "sample and hold" circuits and other difficulties inherent in any multiplex system.

In a preferred embodiment of the copending application, a plurality of digital words are read out of an output register of a digital computer, or the like, and loaded serially by word into a buffer memory device. Next, the memory device is interrogated to convert all of the digital words simultaneously, serially by bit, commencing with the least significant bit and terminating with the most significant bit.

According to the present invention, there is provided an improved version of the time-weighing analog-to-digital converter of the above-referenced copending application which eliminates several possible errors which may arise during a conversion operation, as well as affording increased resolution capabilities. As previously stated, a precision reference voltage is coupled to the output terminal for a time interval corresponding to the significance of the particular bit. It has been found, however, that various sequences of digital data results in relatively large transient pulses being generated, which may seriously interfere with the operation of the analog device coupled to the output terminal.

In a binary time-weighing system each bit is allotted a time interval which equals the sum of the time intervals allotted to all bits of lesser significance plus the time interval allocated to the LSB. Thus, such a system takes approximately one-half of a conversion cycle to convert the most significant bit and the remaining half of the cycle to convert all the lesser bits. Therefore, a binary number such as 0111–111, wherein the MSB differs from all lesser significant bits, will operate the switch so as to provide essentially a square wave, which after filtering provides an analog output signal of approximately zero volts. If, however, the least significant bit (LSB) then slightly increases by one unit, to the next digital number 1000–000, prior to the next conversion operation, the transistor switch again will provide essentially a square wave, but a square wave which is shifted in phase by approximately 180°. The application to a filter of one square wave during one conversion cycle followed immediately by the phase-shifted square wave during the next conversion cycle results in an erroneous transient pulse in the analog output voltage from the filter. Because this transient pulse results when the digital data changes from one form 011111111 to a fold-over form, the problem is hereinafter termed the "foldover" problem.

It has been discovered, according to the present invention, that the erroneous transient pulses resulting from foldover may be substantially eliminated by dividing the time interval required by one or more of the most significant bits into first and second portions, and thereafter applying the first portion to the transistor switch prior to the application of the lesser significant bits to the transistor switch, and finally, after the conversion of all of the lesser significant bits, applying the second portion of the time interval required by the one or more of the most significant bits to the transistor switch. In this manner, a symmetrical waveform is applied to the input of the filter, and no large transient pulse will be generated even when converting a second digital number which is a folded-over version of its immediately preceding number.

Additionally, it will be understood by those skilled in the art, that the number of binary bits per digital information number, or word, in the buffer memory device is, in general, preselected, and therefore the conversion resolution is normally also preselected. But due to the fact that the digital computer word length is not preselected in that other and different computer or digital data sources may be employed, it is often desirable that the resolution capability of the digital-to-analog converter be increased over that normally available from the preselected buffer memory device.

This feature is attained, according to the present invention by combining the least significant bit as determined by the word length storable in the buffer memory device, with lesser significant bits available from the computer, thereafter storing this combined bit in the buffer memory device. Further, this combined bit is converted in a novel sequence dependent on the individual values of the combined bits, all as more particularly hereinafter described.

It is an object, therefore, of the invention to provide an improved digital to analog converter.

Another object of the invention is to provide a digital to analog converter employing time weighing conversion in a novel manner to eliminate fold over.

A further object of the invention is to provide an improved time weighing digital to analog converter which is effective to provide increased conversion resolution capabilities.

Still another object of the invention is to provide an improved time-weighing digital-to-analog converter wherein the value of each bit of the digital information word being converted is coupled to an output terminal for a time interval dependent on the significance of the bit, and wherein the sequence in which the values are coupled to the output is selected to suppress the possibility of any fold over.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
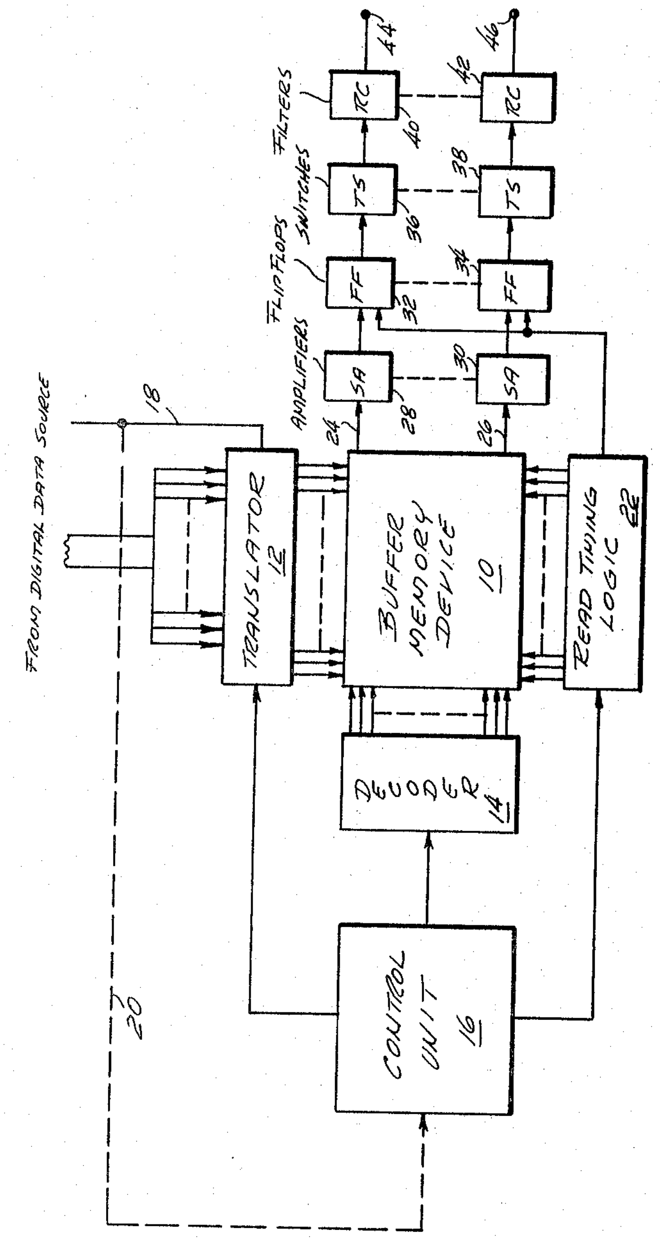
FIG. 1 is an elementary block diagram of one embodiment of the data conversion system of the present invention.

Referring now to the drawings, there is illustrated in block diagram form in FIG. 1, a first preferred embodiment of the digital to analog data conversion system of the present invention. As there shown, a buffer memory device 10 is operative as the working memory portion of the data converter system. During normal operations words are loaded into the buffer device from a digital data source (not shown) through a translator 12, the operation of which is hereinafter more particularly described, under control of a decoder device 14. As will be understood by those familiar with the art, buffer device 10 generally includes at least a plurality of bistable magnetic cores arranged in the standard columns and rows, the remanent state of which is indicative of either a stored binary 1 or a stored binary 0, as the case may be. Additionally, decoder 14 is selectively operable, under control of a control unit 16 to sequentially load words into buffer device 10 parallel by bit, that is, each word is stored in its predetermined row at one time.

Further, translator 12 is, in general, timed by a pulse signal on a line 18 coupled to the digital data source, which signal may also be employed to time control unit 16 by means of a further line 20 in the conventional manner, it being understood that the pulse signals provided by line 18 normally have a repetition rate equal to the time interval required for a complete conversion operation in order that the digital to analog data conversion system operate without any time delay.

During a conversion operation, a read timing logic unit 22, and a decoder 14 are effective to read out sequentially the values of the successive bits of all of the words stored in buffer device 10. Generally, 200 or more words are stored in buffer memory device 10, and the bits of equal significance of all of the words are simultaneously presented on individual output lines, such as those indicated as 24 and 26 in FIG. 1, by way of example, the number of output lines being equal to the number of words storable in buffer memory device 10. The signals appearing on output lines 24 and 26 are next fed through individual analog output channels, each including a sense amplifier (28 and 30), a flip-flop (32 and 34), a transistor switch (36 and 38), and an RC filter (40 and 42), to separate analog output terminals shown as 44 and 46 in FIG. 1.

During a read operation, read timing logic circuit 22 is effective to sequentially provide a number of timed read signals, the timing between adjacent read signals being dependent on the significance of the particular bit being read as more particularly hereinafter described. Referring now specifically to only line 24, it being understood that each of the remaining analog output channels operate in identical fashion, should the core being interrogated by read timing logic unit 22 be storing a binary 0, the signal appearing on line 24 exhibits a magnitude which is insufficient to exceed the threshold level of sense amplifier 28, and under these conditions amplifier 28 effectively "blocks" the signal indicative of a binary 0. Thus, no input is applied to the SET input of flip-flop 32 and flip-flop 32 remains in the OFF state with the result that transistor switch 36 applies a predetermined negative reference potential to the input of filter 40.

Conversely, however, should the next core interrogated be storing a binary 1, the signal appearing on line 24 at this time exhibits a magnitude which is sufficient to exceed the threshold level of sense amplifier 28. Then the amplified output signal provided by the amplifier and applied to the SET input of flip-flop 32 switches the flip-flop to the ON state. Under these conditions, transistor switch 36 applies a predetermined positive reference potential to the input of filter 40. Again it should be noted that the time interval during which switch 36 applies the selected one of the positive and negative reference potentials to the input of filter 40 is determined by the significance of the particular bit being interrogated by read timing unit 22. Further, to ensure that switch 36 operates to apply the proper potential continuously to the filter during the entire time interval, flip-flop 32 is employed as a temporary memory device to store the value of the bit read out of buffer memory device 10.

Continuing, should the next successive bit read out of the buffer be a binary 0, sense amplifier 28 again is effective to block any signal appearing on line 24. Additionally, another output from read timing logic unit 22 appearing on a line 48 operates to reset flip-flop 32 to the OFF state, resulting in transistor switch 36 once again applying the negative reference potential to the input of filter 40. However, when the next successive bit read out of the buffer is also a binary 1, the output of sense amplifier 28 is effective to suppress the reset signal appearing on line 48, causing flip-flop 32 to remain in the ON state and thereby maintain the positive reference potential being applied to filter 40. It should also be understood that the action of filter 40 is to average the combination of positive and negative reference potentials applied to its input and thereby to provide the desired analog signal having an amplitude proportional to the digital information number being converted.

The foregoing brief description of the overall data conversion system of the present invention is identical with the system disclosed in the referenced copending application Ser. No. 260,218, and resort should be had thereto for a more detailed description as well as exemplary schematic diagrams of the individual blocks shown in FIG. 1.

Figure 2:
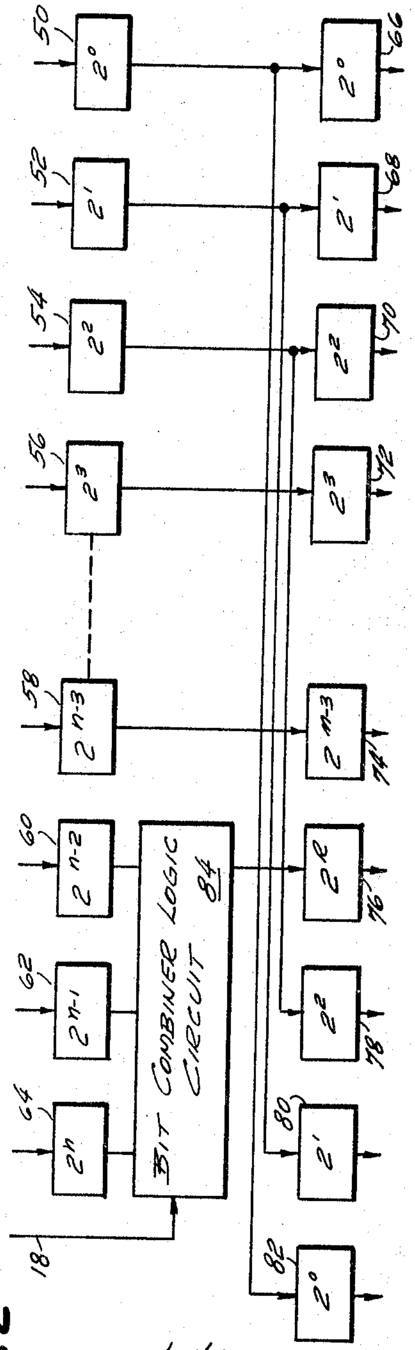
FIG. 2 is a further detailed block diagram of the translator shown in the embodiment of FIG. 1.

Referring now to FIG. 2, there is illustrated a further detailed block diagram of translator 12 of FIG. 1. As there shown, the several binary data bits from the digital data source are applied first to a series of individual gates 50 through 64, one for each binary bit, and thence, after being combined in a novel manner, to a further series of individual gates 66 through 82. The operation of all of the gates is, in general, under control of control unit 16, whereby each output line from gates 66–82 as connected (via a "write" amplifier, if desired) to the "write" winding of an individual column of cores within core matrix 10. All of the write windings in a given column of cores are connected in series. Decoder 14 selectively energizes further write windings on a row-by-row basis and any core in matrix 10 is switched by coincident energization of both its row write winding and its column write winding, so that decoder 14 determines by energizing one of its output lines at a time, precisely which row of cores a given digital word from translator 12 will be stored. Since there are many and various systems well known in the art for rippling information through devices such as translator 12, a specific system will not be described herein, it being sufficient to understand that translator 12 is operative to couple the binary information from the digital data source to buffer memory device 10 each time a word is to be written in the buffer.

Further shown in FIG. 2 are the significances accorded each binary bit. For example, gate 50 receives from the digital data source the most significant bit, MSB, gate 52 the next most significant bit, MSB−1, etc., proceeding to gate 64, which receives the least significant bit, LSB. For convenience, these bits are labelled in terms of powers of two wherein MSB is identified as $2^{\circ}$, MSB−1 as $2^1$, LSB as $2^N$, etc. Also as shown in FIG. 2, the output of gate 50 is directly connected to an input line of gate 66, the output of gate 52 to gate 68, and, continuing in like manner, the output of gate 58 is directly connected to an input line of gate 74. However, as will become clear as the description proceeds, only one output gate is available for gates 60, 62, and 64. For this reason, a novel bit combiner logic circuit 84 is employed to which are applied the $2^{N-2}$, $2^{N-1}$, and $2^N$ bits, circuit 84 being effective to provide a weighted bit $2^R$, which is fed to gate 76. A more detailed discussion of bit combiner logic circuit 84 will hereinafter be given at the conclusion of the overall description of the operation of translator 12.

Figure 4:
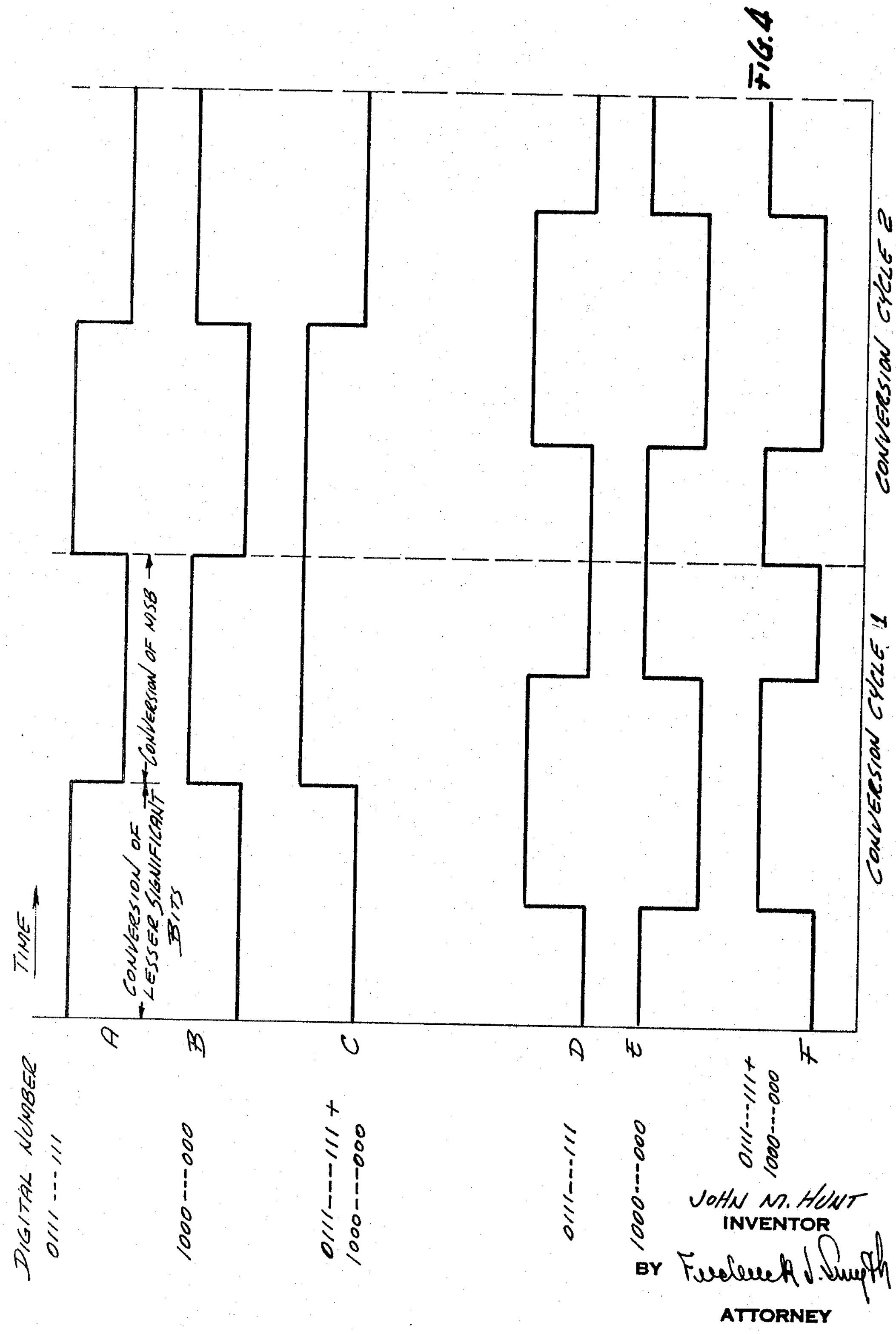
FIG. 4 is a timing diagram illustrating one aspect of the embodiment illustrated in FIG. 1.

It should also be noted, and this is another important feature of the present invention, that the outputs of gates 50, 52, and 54 are also directly connected to the inputs of gates 82, 80, and 78, respectively, and it is this important feature which is effective to eliminate the fold over problem. Referring to FIG. 4, there are illustrated output waveforms from a transistor switch available under various input conditions, wherein curves A, B, and C depict the operation of the system disclosed in the copending application, and curves D, E, and F show the present system.

Curve A of FIG. 4 illustrates a conversion operation performed in ascending order of bit significance with the digital number 0111–111 applied to the system. As shown, the lesser significant bits result in a positive output being provided by the transistor switch, each of the bits being applied for a time interval in accordance with its significance, that is the LSB is applied for one time interval, the LSB+1 is applied for two time intervals, the LSB+2 is applied for four time intervals, etc. Lastly, the most significant bit, binary 0 is applied for its time interval, and it is obvious that the resultant waveform has an average value of approximately zero. In similar fashion, the digital number 1000–000, and increase of one binary bit in the LSB position, produces a resultant waveform which also has an average value of approximately zero as shown in curve B of FIG. 4.

However, when the digital number 0111–111 is present during conversion cycle 1 and the digital number 1000–000 is present during conversion cycle 2 fold over results, as shown in curve C of FIG. 4. Note that at the end of conversion cycle 1 and also during the first half of conversion cycle 2 the output of the transistor switch remains positive. Although the average value of the waveforms generated during each conversion cycle, is essentially zero, the positive output extending throughout the second half of conversion cycle 1 and the first half of conversion cycle 2 will be momentarily sensed by the filter as a large change in the average value of the analog output voltage, and the filter accordingly provides a positive-going transient pulse which may considerably exceed the actual and accurate analog value which would be provided if the pulses were averaged over a longer time period. Such transient pulses frequently interfere with proper operation of the analog devices connected to be operated by the analog output voltages. For example, in a flight simulator such pulses may cause unrealistic jumps in indicated flight quantities. In various other applications where the analog pulses are fed to closed-loop devices, such as servomechanisms, such pulses may place stringent stability requirements upon the design of the servomechanisms. While it is possible to attenuate or practically eliminate such pulses by utilizing filters which have long time constants, such filters then necessarily greatly degrade the frequency response of the overall conversion system, thereby materially decreasing the output analog information available.

Curves D, E, and F illustrate the waveforms provided by the present invention, which completely suppresses the transient pulses resulting from fold over. Remembering now, with respect to FIG. 2, that the most significant bits are applied to gates 82, 80, and 78, which precede the gates associated with the lesser significant bits, as well as to gates 66, 68, and 70 which succeed the lesser significant bits, it should now be apparent that the three most significant bits are read out of buffer memory device 10 both before and after the reading out of the lesser significant bits, thereby eliminating the fold over problem. Further, it should now also be apparent that the time interval during which the value of each of the three most significant bits are applied to the input of the transistor switch is still determined by the bit significance, and for this reason it is generally preferable that each of these time intervals be divided into two equal portions.

This operation is shown by curve D of FIG. 4 which illustrates the output of the transistor switch when the digital number 0111–111 is applied to the system. Note that the MSB is first applied to the transistor switch for one-half its normal time interval, then the lesser significant bits are applied, and finally the MSB is applied again for one-half its normal time interval. Curve E illustrates the corresponding waveform for the digital number 1000–000. Considering again now the case where the number 0111–111 is applied to the system during conversion cycle 1 and the number 1000–000 is applied during conversion 2, it should be noted that the resultant waveform does not include the extended positive waveform previously obtained, because no extended waveform portion is applied to the filter, no extreme transient pulse will result upon the filtering of the waveforms at F. Although the invention has been specifically described with the three most significant being time multiplexed, a greater or lesser number of bits may be so multiplexed if desired, provided only that the selection start with and include the MSB and proceed successively therefrom. It is important to note that the multiplexing of the MSB, that is, applying its value to the transistor switch both before and after the application of the lesser significant bits thereto is primarily effective to suppress the foldover problem, since the MSB is applied for the longest time interval and therefore can generate the undesirable low frequency components. Although the multiplexing of the three most significant has proven effective to decrease the amplitude of any transient pulse below a minimum detectable level, it should also be understood that multiplexing additional significant bits is effective to further decrease the amplitude of any transient pulse.

Figures 3, 3A:
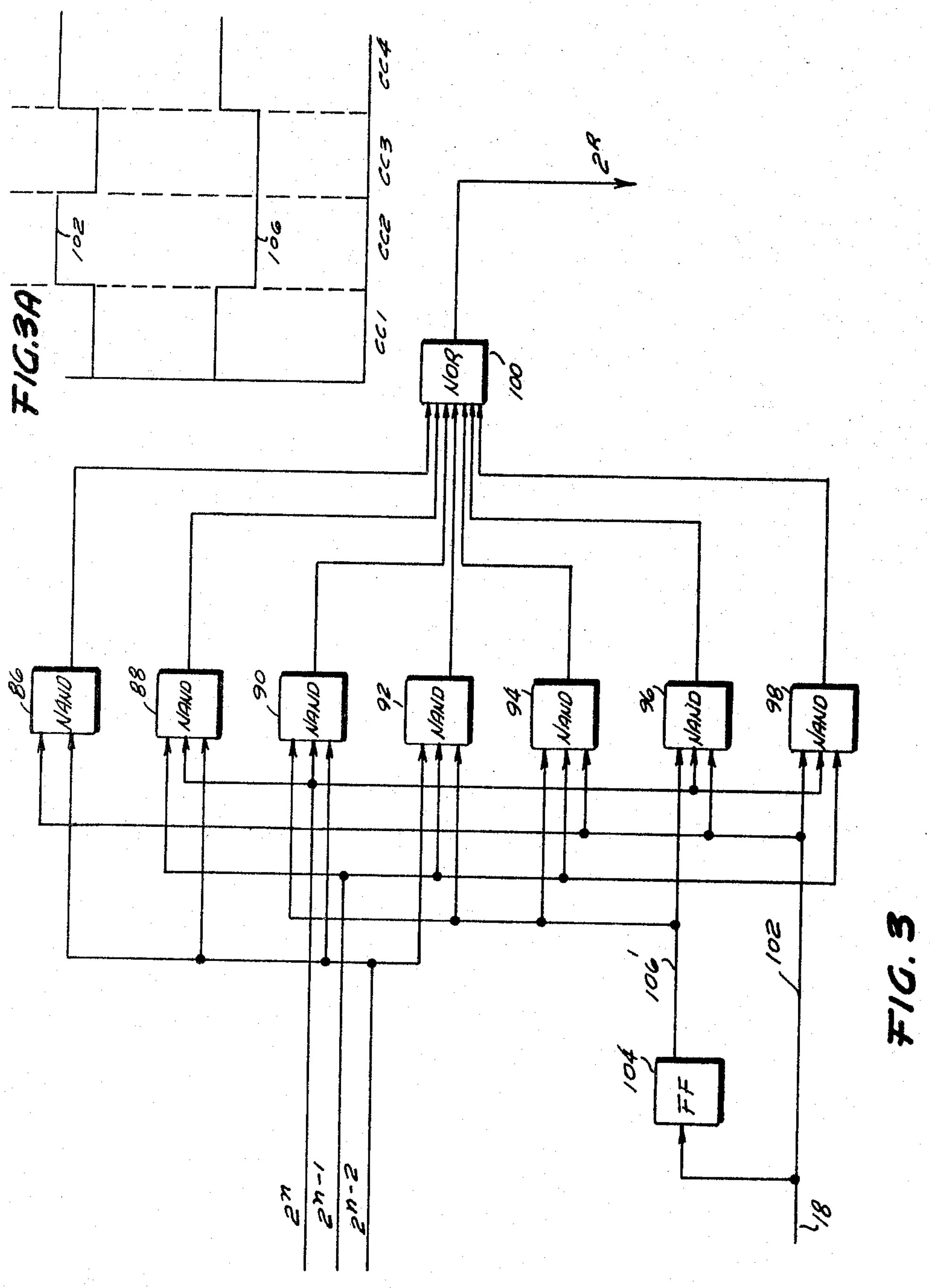
FIGS. 3 and 3A are still further detailed block diagrams of the bit combiner logic circuit shown in FIG. 2 together with appropriate waveforms.

FIG. 3 illustrates bit combiner logic circuit 84 in block diagram form. As hereinbefore stated, the word length storable in buffer memory device 10 is generally predetermined and therefore the buffer is normally inoperative to accept from the computer words of greater length. Thus, the resolution obtainable in the computer is lost in the converter system. By way of example, if the $2^{N-2}$ bit from gate 60 were applied directly to gate 76, the $2^{N-1}$ and $2^N$ bits would be ineffective to modify the analog output voltage, since the length of a word storable in the buffer is limited to $2^{N-2}$ bits. However, by logically combining these bits during a number of successive conversion cycles, increased resolution capabilities are attained. As shown in FIG. 4 the $2^{N-2}$, $2^{N-1}$, and $2^N$ bits, the least significant bits supplied by the digital data source, are coupled in various combinations to an array of NAND circuits 86 through 98, the output of each of the NAND circuits being applied to a NOR circuit 100. Additionally, a timing wave indicated as 102 in FIG. 3A, and supplied by line 18 (see FIG. 1) is also applied to the input lines of selected ones of the NAND circuits. Waveform 102 is also applied as shown in FIG. 3 to a flip-flop 104 to provide a waveform 106, shown in FIG. 3A, which is also connected as shown by line 106' in FIG. 3 to selected ones of the NAND circuits.

In order to understand the operation of bit combiner logic circuit 84, the following logic rules are summarized. A binary 1 is represented by the most negative excursion of a waveform and a binary 0 is represented by the most positive excursion. Further, when all the inputs to any of the NAND circuits are negative (binary 1) the output is positive (binary 0), and when any input to NOR circuit 100 is positive (binary 0) the output is negative (binary 1). Next, considering waveforms 102 and 106 as shown in FIG. 3A for four consecutive conversion cycles, it should be obvious that during conversion cycle 3, NAND circuits 94 and 96 are effective to set the value of $2^R$ to binary 1, independent of the value of $2^{N-2}$ when either $2^{N-1}$ or $2^N$ has a value of binary 1. This results from the fact that during this conversion cycle waveforms 102 and 106 are in the binary 1 state and they are combined only with bit $2^{N-1}$ in NAND circuit 94 and only with bit $2^N$ in NAND circuit 96. It should also be apparent that during conversion cycle 4, waveforms 102 and 106 are in the binary 0 state and therefore any NAND circuit to which they are coupled is ineffective to set $2^R$ to the binary 1 state. However, NAND circuit 88 is controlled only by the values of the three bits being combined and will set 2R to the binary 1 state during this conversion cycle, as well as during each of the other conversion cycles, provided all of the three bits are in the binary 1 state.

From this brief review of the circuit shown in FIG. 3, it should now be understood that the following logical truth table is sufficient to describe the operation of bit combiner logic circuit 84:

LOGICAL TRUTH TABLE

| Binary Bit Significance | | | Value Assigned to $2^R$ | | | |
|---|---|---|---|---|---|---|
| $2^{N-2}$ | $2^{N-1}$ | $2^N$ | Conversion Cycle | Conversion Cycle 2 | Conversion Cycle | Conversion Cycle 4 |
| 0 | 0 | 0 | 0 | 0 | 0 | 0 |
| 0 | 0 | 1 | 0 | 0 | 1 | 0 |
| 0 | 1 | 0 | 0 | 0 | 1 | 0 |
| 0 | 1 | 1 | 1 | 0 | 1 | 0 |
| 1 | 0 | 0 | 1 | 0 | 1 | 0 |
| 1 | 0 | 1 | 1 | 1 | 1 | 0 |
| 1 | 1 | 0 | 1 | 1 | 1 | 0 |
| 1 | 1 | 1 | 1 | 1 | 1 | 1 |

Thus even though the two least significant bits are in fact not stored in the buffer, the weighed bit $2^R$ effectively is adjusted to compensate the analog output voltage in accordance with the value of these bits. The importance of this feature may best be understood by considering the conversion of a monotonically varying digital number into the desired analog output voltage. If the two bits of least significance are employed to modify the analog signal, then the signal remains constant until four LSB's have been additionally supplied by the digital number source. Further, while three bits are shown combined to provide the $2^{R\text{th}}$ bit, in order to increase the resolution capabilities of the converter system, a greater or lesser number of bits may also be so combined.

In summary then, there has been disclosed an improved time weighed digital to analog converter wherein foldover is essentially suppressed by multiplexing one or more of the most significant bits of each of the digital numbers being converted, and, further, the converter is also effective to recognize the value of lesser significant bits available from the digital data source, even though these bits are not storable in the buffer memory when the word length available from the digital data source exceeds that of the buffer, through a novel combiner circuit. Although only three bits have been shown as so combined, by way of example, it should also be understood that a greater number of bits may likewise be combined, provided only that a greater number of conversion cycles are employed in order to assign the proper value of the $2^R$, or roundoff, bit.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. A data conversion system for converting multi-bit digital data words into corresponding analog voltage signals comprising, (a) a source of multi-bit digital data words, the bits of each of said words being normally arranged in a predetermined order of bit significance;

(b) a two dimensional buffer memory device;

(c) translator means coupled between said source and said device operable to rearrange said predetermined order of bit significance of said multi-bit digital data words with at least one most significant bit both preceding and succeeding the bits of lesser significance;

(d) an output terminal;

(e) first and second reference potential sources;

(f) means for successively interrogating said buffer memory device at time intervals proportional to the significance of said bits to determine the binary value of each of said bits; and (g) means for connecting one of said first and second potential sources to said output terminal in accordance with said determined binary value during each of said time intervals.

2. The system of claim 1 wherein the number of bits in each of said multi-bit digital data words exceeds the number of bits storable in said buffer memory device and said translator means is further effective to successively combine selected ones of the lesser significant bits in excess of the number of bits storable in said buffer memory device to provide a single storable roundoff bit in accordance with the values of said selected ones of the lesser significant bits.

3. The system of claim 1 including means coupled to said output terminal for smoothing the voltage waveform appearing at said output terminals to provide said analog signal.

4. A data conversion system comprising, (a) a source of multi-bit digital data words, the bits of each of said words being normally arranged in a predetermined order of bit significance;

(b) a two dimensional buffer memory device, the number of bits per word storable therein being less than the number of bits in each of said multi-bit digital data word provided by said source;

(c) translator means coupled between said source and said device operable to rearrange said predetermined order of bit significance of said multi-bit digital data words with at least one most significant bit both preceding and succeeding the bits of lesser significance and further operable to combine a number of bits of said multi-bit digital bits to provide a roundoff bit storable in said buffer memory device;

(d) an output terminal;

(e) first and second reference potential sources;

(f) means for successively interrogating said buffer memory device at time intervals proportional to the significance of said bits to determine the binary value of each of said bits with the time interval proportional to the significance of said at least one significant bit being divided into a first subtime interval when the value of said bit is interrogated preceding the interrogation of said bits of lesser significance and a second sub-time interval when the value of said bit is interrogated succeeding the interrogation of said bits of lesser significance; and (g) means for connecting one of said first and second potential sources to said output terminal in accordance with said determined binary value during each of said time intervals.

5. The system of claim 4 wherein said first and second sub-time intervals are equal.

6. The system of claim 4 wherein said translator means operates to rearrange the three most significant bits with the MSB, the MSB—1 and the MSB—2 precede in order the lesser significant bits and the MSB—2, the MSB—1, and the MSB succeed in order the lesser significant bits.

7. A data conversion system comprising, (a) a source of digital data words, each of said words including a plurality of binary bits arranged in a predetermined order of significance;

(b) a buffer memory device operable to simultaneously store a plurality of said digital data words;

(c) a read timing logic circuit effective to sequentially interrogate all of said digital data words stored in said buffer memory device serially by bit at a time rate proportional to the significance of the bit being interrogated;

(d) a plurality of output terminals one for each of said digital data words stored in said buffer memory device;

(e) means coupled between said buffer memory device and said plurality of output terminals responsive to both the value of all of said interrogated bits and said read timing logic circuit for coupling predetermined reference voltages to said plurality of output terminals to provide analog voltage signals each of which is commensurate with the value of a corresponding digital data word; and (f) translator means coupled intermediate said source and said buffer memory device operable to combine all of the lesser significant bits available from said source not directly storable in said buffer memory device to provide a roundoff bit which is storable in said buffer memory device as the least significant bit and to provide at least one most significant bit available for interrogation both before and after the bits of lesser significance are interrogated by said read timing logic circuit.

8. The system of claim 7 wherein said read timing logic circuit is further effective to interrogate said at least one most significant bit for first and second equal time intervals, the sum of said first and second equal time intervals being equal to the time interval determined by the significance of said at least one most significant bit.

9. The system of claim 7 wherein said at least one most significant bit is limited to the three most significant bits of said digital data words.

10. Digital-to-analog data conversion apparatus for converting a plurality of multi-bit data words appearing successively in a data word location of a digital data-processing device into a plurality of respective analog voltages comprising, (a) a magnetic core memory device having a first plurality of columns and a second plurality of rows of magnetic cores, an individual write winding and an individual read winding associated with each of said columns, an individual write winding associated with each of said rows, and an individual output winding associated with each of said rows, each of said cores being capable of being magnetized in a given state upon coincident energization of its two associated write windings, and being capable of inducing an output voltage in its associated output winding upon energization of its associated read winding if it previously has been magnetized in said given state;

(b) gating means controlled by advance pulses from said digital data-processing device for selectively energizing said write windings associated with said columns in accordance with the bits of said data word in said data word location;

(c) selective switching means connected to be advanced in synchronism with said advance pulses to energize successively said write windings associated with said rows;

(d) means responsive to periodic pulses from said digital data-processing device for providing a plurality of successive read timing pulses having a time spacing which varies in accordance with the relative significance of successive bits of said digital words and for applying said read timing pulses to respective ones of said read windings;

(e) a plurality of pulse-averaging means; and (f) a plurality of bistable switching means connected to be controlled by said output voltages from respective ones of said output windings to apply reference voltages of predetermined amplitudes to respective ones of said pulse-averaging means for time periods determined by the time spacing of said read timing pulsese thereby to provide a plurality of analog output voltages from said pulse-averaging means, and characterized in that (i) said write windings for a pair of said columns are interconnected and said gating means energize both said windings in accordance with the most significant bit of said data word, (ii) said switching means is connected to energize the write windings of said pair, one before the write windings for the less significant bits and one after the write windings for said less significant bits.

11. Digital-to-analog conversion apparatus for converting a plurality $m$ of successive parallel fractional digital words appearing in a register of a digital computer into a plurality of respective analog voltages comprising, (a) an $m$ by $n$ bit magnetic core memory matrix having $n$ columns and $m$ rows of magnetic cores, $n$ write windings and $n$ read windings associated with respective of said $n$ columns of cores, $m$ write windings associated with respective of said $m$ rows of cores, and $m$ output windings associated with respective rows of said cores, each of said cores being capable of being magnetized in a first state upon coincident energization of its two write windings;

(b) coincidence gates connected respectively between each of the most significant $x$ individual stages of said register (where $x$ is a small positive number) and $x$ pairs of said $n$ write windings, and $(n-2x-1)$ further such gates connected between successively less significant stages of said register and respective of said write windings, and a round-off gate connected between the remaining least significant stage of said register and the last of said write windings, each of said gates being connected to be enabled by an advance pulse from said digital computer and operable in combination to transfer said words rounded off to $n$ bits into said matrix;

(c) a selective switching means connected to be cycled in synchronism with said advance pulses from said computer and operable to energize said $m$ write windings successively;

(d) means responsive to periodic pulses from said computer for providing a plurality of $n$ successive read timing pulses having a time spacing which varies in accordance with the relative significance of successive bits of said digital words;

(e) circuit means for applying said $n$ read timing pulses to respective of said read windings of said memory matrix, thereby to induce output voltages in various of said $m$ output windings;

(f) $m$ pulse-averaging means; and (g) $m$ bistable switching means connected to be controlled by respective of said output voltages to apply different reference voltages of predetermined amplitudes to respective of said pulse-averaging means for time periods determined by the spacing of said read timing pulses, thereby to provide $m$ analog output voltages from said $m$ pulse-averaging means.

References Cited by the Examiner

UNITED STATES PATENTS

| | | | |
|---|---|---|---|
| 3,012,240 | 12/1961 | Klahn | 340—347 |
| 3,210,756 | 10/1965 | Flood | 340—347 |

OTHER REFERENCES

Pages 58–60, August 1961, IBM Technical Disclosure Bulletin, vol. 4, No. 3.

MAYNARD R. WILBUR, *Primary Examiner.*

D. W. COOK, *Examiner.*

K. R. STEVENS, W. J. KOPACZ, *Assistant Examiners.*